US008655932B2

(12) United States Patent
Lu et al.

(10) Patent No.: US 8,655,932 B2
(45) Date of Patent: Feb. 18, 2014

(54) DATA CONVERTING METHOD AND A DEVICE THEREFOR

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 527 days.

(21) Appl. No.: 12/811,468

(22) PCT Filed: Jun. 28, 2010

(86) PCT No.: PCT/CN2010/074598
§ 371 (c)(1),
(2), (4) Date: Jul. 1, 2010

(87) PCT Pub. No.: WO2011/050624
PCT Pub. Date: May 5, 2011

(65) Prior Publication Data
US 2012/0089653 A1    Apr. 12, 2012

(30) Foreign Application Priority Data
Oct. 27, 2009   (CN) .......................... 2009 1 0236912

(51) Int. Cl.
*G06F 7/00*    (2006.01)
*G06F 15/00*   (2006.01)

(52) U.S. Cl.
USPC ........................................................ 708/204

(58) Field of Classification Search
USPC ........................................................ 708/204
See application file for complete search history.

(56) References Cited

U.S. PATENT DOCUMENTS

| 4,610,027 | A | * | 9/1986 | Anderson et al. | 382/245 |
| 4,658,430 | A | * | 4/1987 | Anderson et al. | 382/297 |
| 4,959,785 | A | * | 9/1990 | Yamamoto et al. | 715/234 |
| 5,126,739 | A | * | 6/1992 | Whiting et al. | 341/106 |
| 5,367,705 | A | * | 11/1994 | Sites et al. | 712/41 |
| 2001/0017899 | A1 | * | 8/2001 | Milway | 375/262 |
| 2009/0210467 | A1 | * | 8/2009 | Iorio | 708/204 |
| 2009/0265392 | A1 | | 10/2009 | Taneike et al. | |

FOREIGN PATENT DOCUMENTS

CN    101247233 A  *  8/2008  ............... H04L 9/32

OTHER PUBLICATIONS

Machine Translation of CN 101247233A.*

* cited by examiner

*Primary Examiner* — Chat Do
*Assistant Examiner* — Kevin G Hughes
(74) *Attorney, Agent, or Firm* — Crowell & Moring LLP

(57) ABSTRACT

A data converting method and device therefor are disclosed by the invention, relating to data converting algorithm field, solving the problem of complicate data converting method in prior art. Steps of the invention are obtaining offset from the predetermined byte of the data string to be converted; obtaining the predetermined bits of data from the data string to be converted according to the offset; converting the obtained bits to decimal number; determining whether size of the decimal number is smaller than the first predetermined length, if so, keeping adding 0 to the upper digit of the decimal number till the first predetermined length is reached, and taking the data with added 0 as the converted data; otherwise keeping obtaining data from low bit of the decimal number, till the first predetermined length is reached, and taking the obtained data as the converted data. The method of the invention is mainly used for devices and methods requiring data converting, e.g. one time password generating method and device therefor.

6 Claims, 4 Drawing Sheets

DATA CONVERTING METHOD AND A DEVICE THEREFOR

This application is a national stage of PCT/CN/2010/074598, filed Jun. 28, 2010, which claims priority under 35 U.S.C. §119 to Chinese Patent Application No. 200910236912.8, filed Oct. 27, 2009, the entire disclosure of which is herein expressly incorporated by reference.

FIELD OF THE INVENTION

The invention relates to data converting algorithm field, in particular to a data converting method and a device therefor.

PRIOR ART

When using computer network, various kinds of methods are used for ensuring the security of the network, for example, obtaining message digest by computing for ensuring the completion of the message, or authenticating the password input by a user for ensuring the validity of the user.

The principle of applying message digest is that the message sender computes the message to be sent with one-way Hash encryption function to obtain a message digest, and sends the message and message digest to the receiver; the receiver obtains message digest by the same computing method with that used by the message sender, if the message is tampered when being sent, the computed message digest will differ from the received message digest, and thus the receiver determines whether the message is tampered by comparing the computed message digest and the received message digest, as a result, the completion of the message is ensured by the message digest. With the method, the message digest is obtained by computing message to be sent with one-way Hash function, which is named Digital Finger Print. With fixed size, the message digests computed by different messages are different while message digests computed by the same message are the same, so it can be used for authenticating the completion of the received message.

The principle of password authenticating is generating a password by a data of random generated numbers or symbols, outputting the password in one image, adding some disturbing factors to the image; and the password being identified by user by eyes and being input to a form for submission, the input password being authenticated by a server, and the sever available only after a successful authentication.

During the process of authenticating the above message digest or password, the inventor finds at least disadvantages in prior art, which are that, the above solutions must be implemented by converting a kind of data to another kind, for example, converting message to message digest, or generating password by random numbers or symbols, and different data converting methods are used in different solutions which are all complicated.

SUMMARY OF THE INVENTION

A data converting method and device therefor are provided by the invention, simplifying data converting method.

For making the above purpose, a technical solution is used as follows.

A data converting method comprising:
obtaining offset from the predetermined position of the data string to be converted;
obtaining the predetermined bits of data from the data string to be converted according to the offset;
converting the obtained bits to the decimal number;
determining whether size of the decimal number is smaller than the first predetermined length;
if size of the decimal number is not smaller than the first predetermined length, obtaining the data of the first predetermined length from the lower bit of the decimal number successively and taking the obtained data as the converted data; otherwise if size of the decimal number is smaller than the first predetermined length, keeping adding 0 to the upper digit of the decimal number till the first predetermined length is reached, and taking the data with added 0 as the converted data.

A data converting device, comprising:
a first obtaining unit for obtaining offset from the data string to be converted;
a second obtaining unit for obtaining the predetermined bits of data from the data string to be converted according to the offset;
a converting unit for converting the obtained bits to the decimal number;
a determining unit for determining whether size of the decimal number is smaller than the first predetermined length;
and an outputting unit for obtaining data of the first predetermined length from the lower bit of the decimal number successively and taking the obtained bits as the converted data if size of the decimal number is not smaller than the first predetermined length; and for keeping adding 0 to the upper digit of the decimal number till the first predetermined length is reached, and taking the data with added 0 as the converted data if size of the decimal number is smaller than the first predetermined length.

The data converting method and device therefor provided by the embodiments are implemented by obtaining predetermined bits of data from the data string to be converted successively; computing the obtained bits to obtain the offset, obtaining the predetermined bits of data from the data string to be converted according to the offset; and converting the obtained bits to decimal number and outputting the decimal number of the first predetermined length as the converted data.

If the converted decimal number is larger enough in length, only data of the first predetermined length can be obtained, otherwise, keeping adding 0 to the decimal number till the first predetermined length is reached. So the obtained results are the same in length for the larger converted decimal number or the smaller.

Due to the simple operations in the invention such as obtaining bits, computing to obtain the offset, obtaining the bits successively, format converting, outputting the data of predetermined length, the complicated process of computing to obtain the message digest is eliminated, and therefore the data converting method is more simple than that in prior art, easier to be realized, along with more applicable.

BRIEF DESCRIPTION OF THE DRAWINGS

For clear description of the technical solution of the embodiments, simple explanation will be given to the drawings used by the embodiments or by the prior art. Obviously, the drawings hereafter are just part of drawings of the embodiments, and those skilled in prior art can obtain other drawings without an inventive step.

DETAILED DESCRIPTION OF THE PREFERRED EMBODIMENTS

Figure 1:
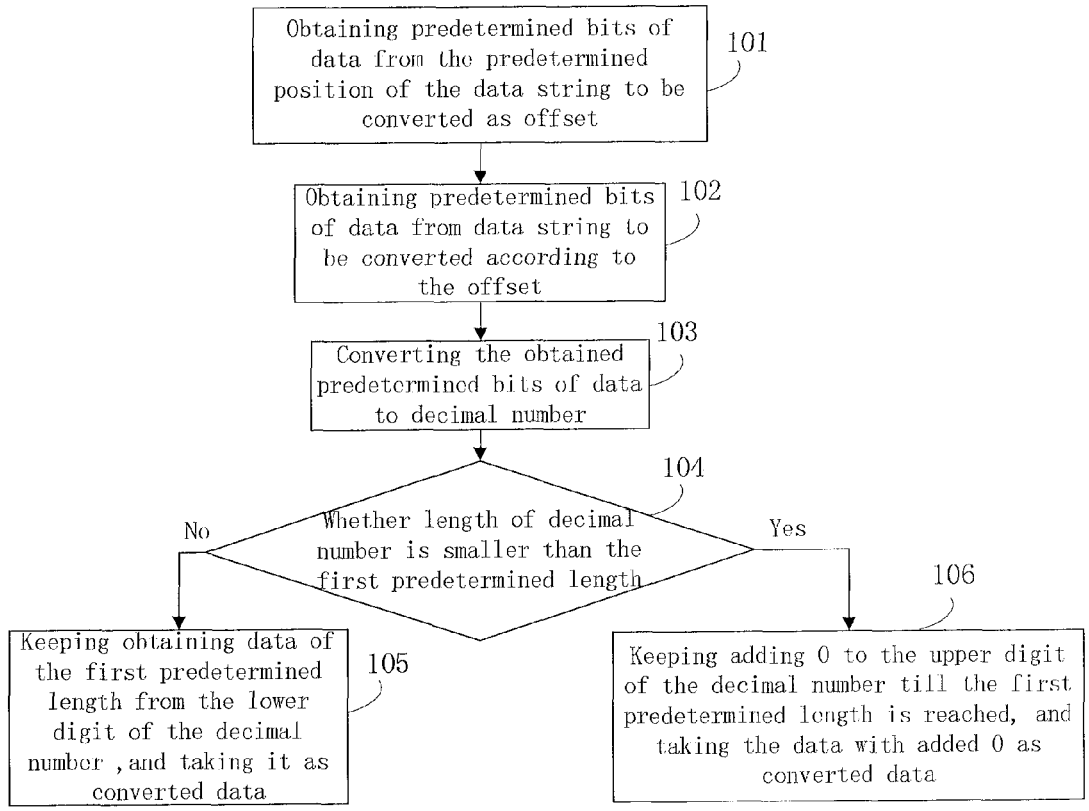
FIG. 1 is a flow chart of data converting method of the embodiments of the invention.

A data converting method is provided by embodiments of the invention, referring to FIG. 1, the method including:

Step 101, after obtaining all kinds of data string to be converted, such as random number, and obtaining the predetermined bits of data from the data string to be converted and taking the obtained bits as offset, for example, obtaining the latest four bits of the last byte of the data string to be converted, or eight bits of the first byte of the data string to be converted etc.

The data string to be converted in the process can be random data directly input by a user or the data computed by non-collision one-way algorithm.

Step 102, after obtaining the offset, obtaining the predetermined bits of data from the data string to be converted according to the offset, wherein the predetermined bits of data in the embodiment can be adjusted according to the length difference in the data string to be converted;

Step 103, converting the obtained predetermined bits of data to decimal number, with the present computing method, such as the method for converting binary data to decimal number or converting hexadecimal number to decimal number.

Step 104, determining whether the length of the decimal number is smaller than the first predetermined length, if the length of the decimal number is not smaller than the first predetermined length, going to step 105; if size of the decimal number is smaller than the first predetermined length, going to step 106.

Step 105, obtaining data of the first predetermined length from the lower bit of the decimal number successive and taking the obtained data as the converted data.

Step 106, keeping adding 0 to the upper digit of the decimal number till the first predetermined length is reached, and taking the data with added 0 as the converted data.

Figure 2:
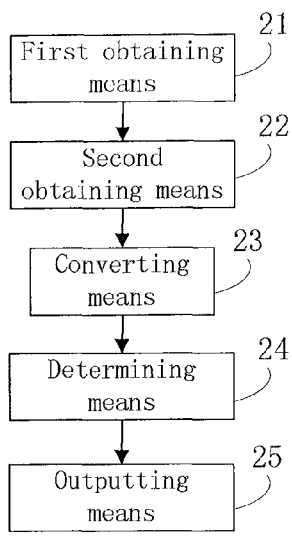
FIG. 2 is a structural diagram of the data converting device of the embodiments of the invention.

A data converting device is provided by the embodiment of the invention, referring to FIG. 2, including a first obtaining unit 21, a second obtaining unit 22, a converting unit 23, a determining unit 24 and an outputting unit 25.

After obtaining all kinds of data string to be converted, the first obtaining unit 21 is used for obtaining offset from the data string to be converted, and the data string to be converted can be a random number directly input by a user or data computed by non-collision one-way algorithm;

the second obtaining unit 22 is used for obtaining the predetermined bits of data from the data string to be converted according to the offset;

the converting unit 23 is used for converting the obtained bits to decimal number;

the determining unit 24 is used for determining whether size of the decimal number is smaller than the first predetermined length;

the outputting unit 25 is used for obtaining data of the first predetermined length from the lower bit of the decimal number successive if size of the decimal number is not smaller than the first predetermined length, or keeping adding 0 to the upper digit of the decimal number till the first predetermined length is reached, and taking the data with added 0 as converted data if size of the decimal number is smaller than the first predetermined length.

The data converting method and device therefor provided by the embodiments are implemented by obtaining predetermined bits of data from the data string to be converted successive; computing the obtained bits to obtain the offset, obtaining the predetermined bits of data from the data string to be converted according to the offset; and converting the obtained bits to decimal number and outputting the data of the first predetermined length as the converted data.

If the converted decimal number is larger enough in length, only data of the first predetermined length can be obtained, otherwise, keeping adding 0 to the decimal number till the first predetermined length is reached. So the obtained results are the same for the larger decimal number or the smaller.

Due to the simple operations in the invention such as obtaining bits, computing to obtain the offset, obtaining the bits successively, format converting, outputting the data of predetermined length, the complicated process of computing to obtain the message digest is eliminated, and therefore the data converting method is more simple than that in prior art, easier to be realized, along with more applicable.

For clear description of the application of the embodiments, simple explanation will be given to the technical solutions used by the embodiments, and obviously, the embodiments herein are only part of embodiments, not all embodiments of the invention. All embodiments obtained by those skilled in prior art without involved in an inventive step will be protected by the invention.

Embodiment 1

Figure 3:
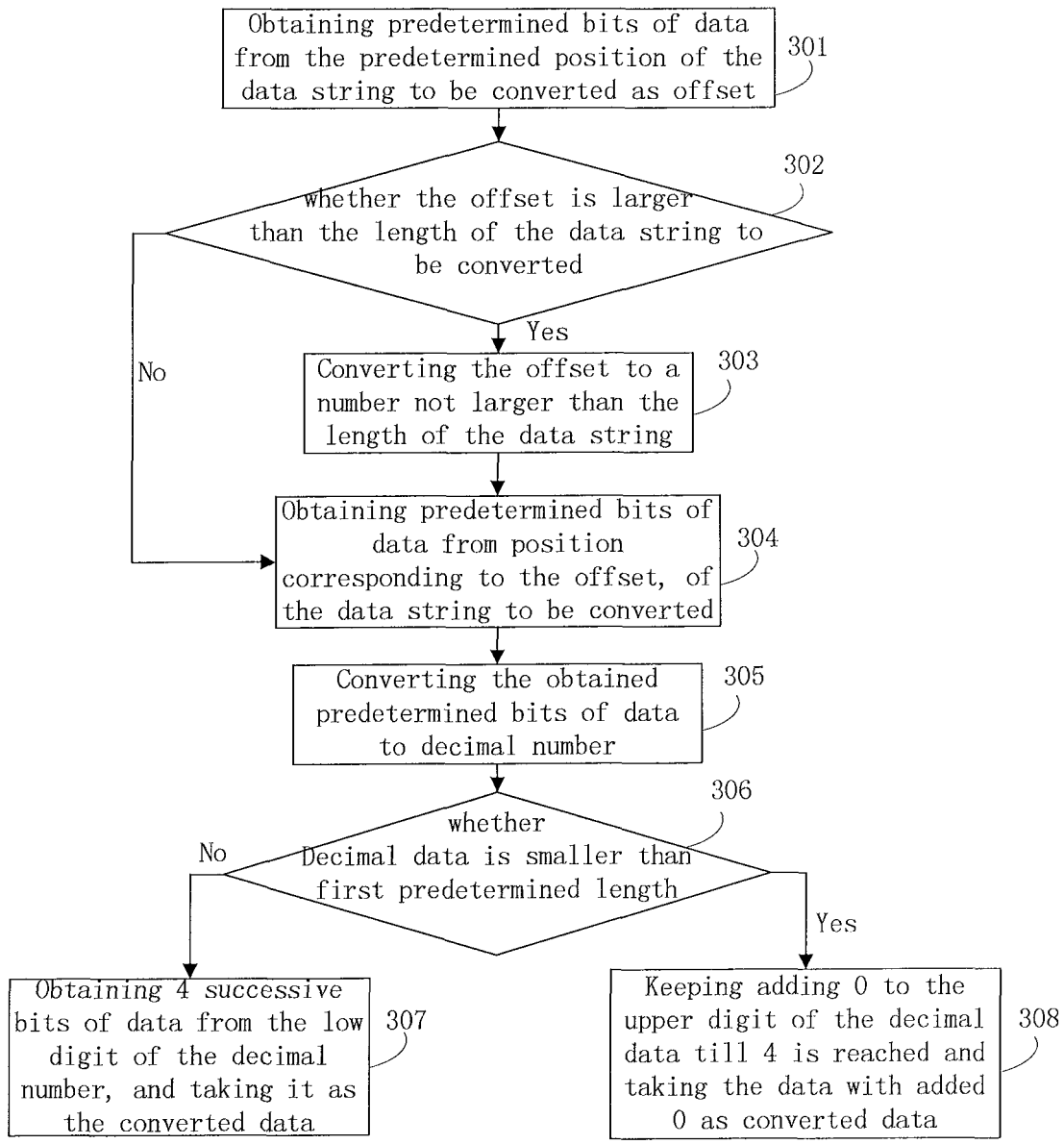
FIG. 3 is a flow chart of data converting method of embodiment 1 of the invention.

Referring to FIG. 3, a data converting method is provided by the embodiment. Taking an example of converting the Hexadecimal number 0x3A4362FE8094C8A11D7F5BE38410E8F16758DA23FF3B3E85D7 to 4-bit decimal number for explanation, the first predetermined length is 4, and steps of the data converting method are as follows.

Step 301, after obtaining the data string to be converted, obtaining the predetermined bits of data from the predetermined position of the data string to be converted and taking the obtained bits as offset.

The predetermined position can be the first byte, the last byte or any middle byte of the data string to be converted. Generally, if size of the data string to be converted is known, the predetermined position can be any byte of the data string to be converted, for example, the one-third of size of the middle of the data or any specified location such as second and third byte of the data, etc. Preferably, in the embodiment the first byte of the data string to be converted is obtained and taken as offset 0x3A.

If size of the data string to be converted is known and smaller, for random consideration, before step 301 of the embodiment, the smaller data string to be converted can be pre-computed, that is computing the data string to be converted with non-collision one-way algorithm, which is hash algorithm or Hash-Base Message Authentication Code algorithm (HMAC), such as SHA-1 algorithm etc.

Step 302, for ensuring obtaining the predetermined bits of data from the data string to be converted, the obtained offset need to be regulated, and therefore determining whether the offset is larger than that of the predetermined data string to be converted is a must, if so, it determines the offset overflow, go to step 303; otherwise, it determines the offset not overflow, go to step 304.

In the step, determining whether the offset is larger than the length of the data string is converting the obtained offset to decimal number, and comparing size of the decimal number with that of the data string to be converted, if the offset is larger than that of the data string to be converted, it determines the offset overflow.

In the example of the embodiment, size of the decimal number 58 corresponding to the obtained offset 0x3A is larger than size of the data string to be converted 25, and therefore the offset is overflow, go to step 303.

Step 303, converting the offset to a value not bigger than the length of the data, which is taking the residue computed by the decimal number divided by the length of the data string to be converted, as the offset, the length of the data string as N, the offset as n, with codes While (n>N)
n=-N;

which means if the offset is larger than the length of the data string, taking the differential computed by the offset minus the length of the data string till the offset is not bigger than the length of the data string, as the offset.

According to the computing method, the decimal number 58 obtained from the step 302 corresponds to the offset 0x08.

In the embodiment, new offset is obtained from computing the original offset, and in practice, it can be obtained from bits of data, to be converted, including 8 bits or 4 bits or other bits of data.

Step 304, after obtaining the offset, obtaining the predetermined bits of data from the position, corresponding to the offset, of the data string to be converted, wherein the predetermined bits can be obtained according to the length of the data string to be converted. In the embodiment, the predetermined bits can be 15 bits, and the obtained data of the predetermined bits is 0x1D7F, which is obtained from the offset 0x08.

Step 305, converting the obtained predetermined bits of data 0x1D7F to decimal number 7551.

Step 306, determining whether size of the decimal number is smaller than the first predetermined length, if the length of the decimal number is not smaller than the first predetermined length, going to step 307; otherwise, going to step 308.

In the embodiment, the first predetermined length is 4, being same with size of the decimal number 7551 computed by step 305, and therefore the step 307 will be executed.

Step 307, keeping obtaining data from the lower digit of the decimal number till the first predetermined length is reached, and taking the obtained data as converted result, from the above description, the converted data 7551 is gotten; taking X as the obtained predetermined bits of data, buff as the buffer storing the converted result, the converting can be implemented by following codes Sprint(buff,"%05d",X);

wherein the lower four bits of Buff refer to the final converted result.

Step 308, keeping adding 0 to the upper digit of the decimal number till the first predetermined length is reached, and taking the data with added 0 as the converted data; which means if the decimal number converted by the obtained predetermined bits of data is smaller than 4 bits, keeping adding 0 to the decimal number till four bits are reached, and converting the data with added 0 to the converted data.

The data converting method and device provided in the embodiment is implemented by obtaining the predetermined bits of data from the data string to be converted; computing the obtained bits to obtain the offset, obtaining the predetermined bits of data from the data string to be converted according to the offset; and converting the obtained bits to decimal number and outputting data of the first predetermined length as the converted data. If the converted decimal number is larger enough in length, obtaining the data of first predetermined length; otherwise, keeping on adding 0 to the decimal number till the first predetermined length is reached. So the obtained results are the same for the larger decimal number or the smaller.

Due to the simple operations in the invention such as obtaining bits, computing to obtain the offset, obtaining the bits successively, format converting, outputting the data of predetermined length, the complicated process of computing to obtain the message digest is eliminated, and therefore the data converting method is more simple than that in prior art, easier to be realized, along with more applicable.

Embodiment 2

A data converting method is provided by the embodiment, in which the data string to be converted is taken as one of the predetermined bytes larger in length and is stored in Big-Endian (the lowerest address for storing the most significant byte) format. The data string to be converted in the embodiment will be converted to six bits of number, wherein the hexdecimal data string to be converted is 0x5A83152391B06745E0901AA4AF315CC32056516B including 20 bytes.

If length of the data string to be converted is not 20 bytes as needed, the data needs pre-converting to data of 20 bytes with methods such as truncate and bits complementing, etc. The per-converting is computing the data string to be converted by non-collision one-way algorithm, which is Hash algorithm or HMAC algorithm, such as SHA-1 algorithm.

Figure 4:
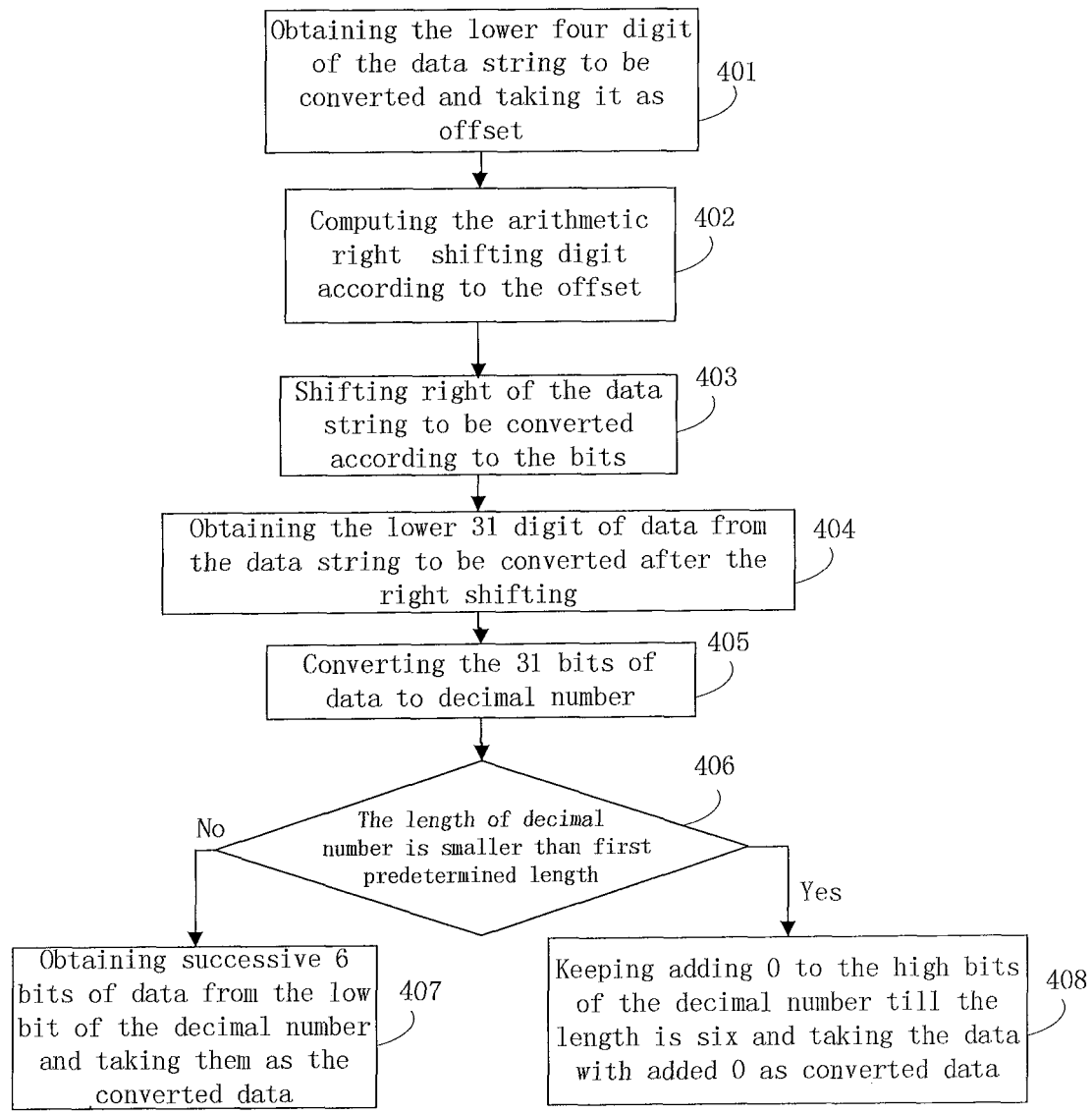
FIG. 4 is a flow chart of data converting method of embodiment 2 of the invention.

Referring to FIG. 4, the data converting method of the embodiment includes steps as follows.

Step 401, obtaining predetermined bits of data from the predetermined position of the data string to be converted successive and taking the obtained bits as offset, which in details is obtaining the lower 4 bits in binary of the data string to be converted and taking the lower 4 bits as offset, such as 0x0B.

A simpler method is used for obtaining offset in the embodiment, while in practice, method of embodiment 1 can be used, so further details are eliminated.

Step 402, obtaining the arithmetic right shifting bits by computing the offset by predetermined formula. The formula can be, not limited to, BITS=128-LBS4*8, in which BITS refers to the arithmetic right shifting bits, LSB4 refers to the offset. The arithmetic right shifting bits are computed with the above predetermined formula 120−11*8=40, and herein the arithmetic right shifting bits refer to the bits of right shifting;

Step 403, arithmetic right shifting of the data string to be converted according to the arithmetic right shifting bits to get the shifted data, which in details is right shifting of the data string to be converted by 40 bits to get the shifted data string 0x00000000005A83152391B06745E0901AA4AF315C.

Step 404, obtaining the predetermined bits of data from the lower bit of the shifted data string to be converted, if the predetermined bits are 31, the data obtained successively from the lower bit of the data string to be converted after the arithmetic right shifting is 0x24AF315C.

The method in the embodiment can use, but not limited to, the method of taking the shifted data string as RESULT1 and the lower 31 bits are RESULT2, and the obtaining method is given with the below codes:

RESULT2=RESULT1&0x7FFFFFFF;

Step 405, converting the obtained predetermined bits of data to decimal number, and from the above data 0x24AF315C, the decimal number 615461212 will be obtained.

Step 406, determining whether size of the decimal number is smaller than the first predetermined length, if the decimal number is not smaller than the first predetermined length, going to step 407; otherwise, going to step 408;

The first predetermined length in the embodiment is 6, which is smaller than size of the decimal number 615461212 obtained from step 405, and therefore step 407 is executed.

Step 407, obtaining data of the first predetermined length successive from the lower bit of the decimal number and taking the obtained data as the converted data, that is obtaining the lower 6 bits as the converted data 461212; taking X as the predetermined bits, buff as the buffer for storing the converted result, and the converting can be implemented by codes Sprint(buff,"%05d",X), wherein the lower 4 bits of Buff is the converted result.

Step 408, keeping adding 0 to the upper digit of the decimal number till the first predetermined length is reached, and taking the data with added 0 as the converted data. In the embodiment, if the decimal number converted by the obtained predetermined bits is smaller than 6 bits, keeping adding 0 to the upper digit of the decimal number till 6 bits are reached, and taking the data with added 0 as the converted data.

The embodiment can be implemented by both software and hardware, and the hardware is used for running instructions of the software including but not limited to codes as follows.

```
// Take the latest 4 bits of the last byte of the data as index
// Compute the 31-bit value of the successive 4 bytes of the data from
the index
// Generate data with the value according to the predetermined bits
idx = data[dig_len - 1] & 0x0f; //Take the latest 4 bits of the last
byte of the value as index
    // Preventing the index from overflow
    if(idx + 3 >= dig_len)
    {
        idx = dig_len- 4;
    }
// Compute 31-bit value of the successive four bytes from the index
    otp = ((data[idx] & 0x7f) << 24) +
          (data[idx + 1] << 16) +
          (data[idx + 2] << 8) +
          data[idx + 3];
    if (digit >= (sizeof(digit_power) / sizeof(digit_power[0])))
    {
        digit =0;
    }
    otp = otp % digit_power[digit]; // Generate an OTP with the
value according to the predetermined bits
```

The data converting method provided by the embodiment is implemented by obtaining the predetermined bits of data from the data string to be converted; obtaining offset by computing the obtained bits, obtaining the predetermined bits of data from the data string to be converted according to the offset; and converting the obtained bits to the decimal number and outputting the data of the first predetermined length as the converted data. If the converted decimal number is larger enough in length, obtaining the data of the first predetermined length; otherwise, keeping on adding 0 to the decimal number till the first predetermined length is reached. So the obtained results are the same in length for the larger converted decimal number or the smaller.

The operations of right shifting of the data string to be converted, and obtaining data from the lower bit of the shifted data in the embodiment simplify the process of obtaining the predetermined bits of data, which improve the efficiency and accuracy of obtaining data.

In combination with such simple operations as obtaining bits, offset by computing the obtained data, successive bits, and format converting, outputting the data of the predetermined length, the invention eliminates the problem of complicated message digest computing process, which in all makes the data converting method more easier than that in prior art, more implementable and applicable.

Embodiment 3

Figure 5:
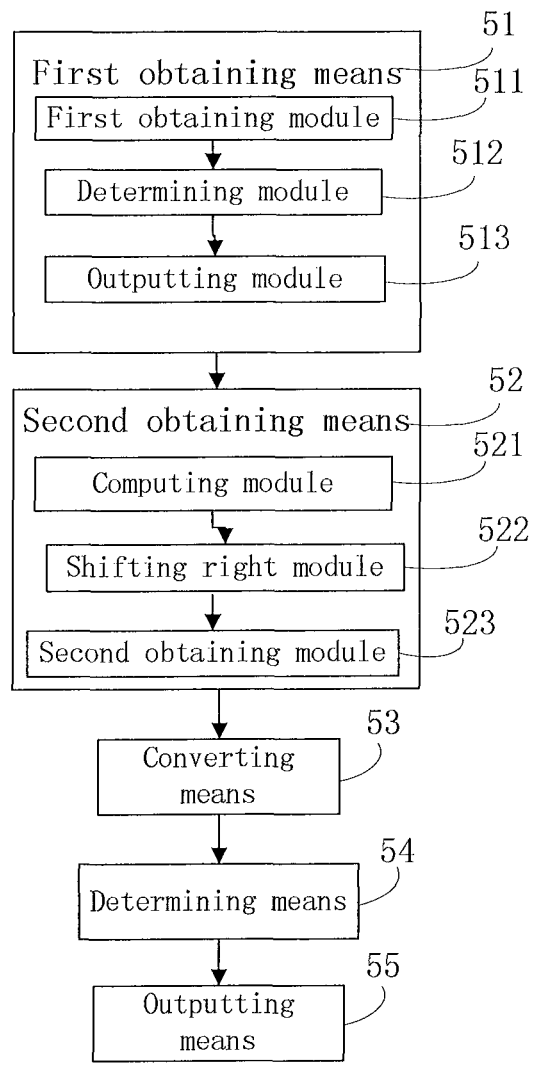
FIG. 5 is a structural diagram of the data converting device of the embodiment 3 of the invention.

A data converting device is provided by the embodiment, referring to FIG. 5, including a first obtaining unit 51, a second obtaining unit 52, a converting unit 53, a determining unit 54 and an outputting unit 55.

After obtaining the data string to be converted, such as random number, the first obtaining unit 51 is used for obtaining offset from the predetermined position of the data string to be converted, which can be random data input directly by a user, or data computed by non-collision one-way algorithm;

the second obtaining unit 52 is used for obtaining the predetermined bits of data from the data string to be converted according to the offset;

the converting unit 53 is used for converting the obtained data to the decimal number;

the determining unit 54 is used for determining whether size of the decimal number is smaller than the first predetermined length;

the outputting unit 55 is used for obtaining data of the first predetermined length from the lower bit of the decimal number and taking the obtained data as the converted data, if size of the decimal number is not smaller than the first predetermined length; or keeping adding 0 to the upper digit of the decimal number till the first predetermined length is reached, and taking the data with added 0 as converted data.

Generally, the first obtaining unit 51 can obtain the offset from first byte, any middle byte or the last byte of the data string to be converted, which includes a first obtaining module 511, a determining module 512 and an outputting module 513.

The first obtaining module 511 is used for obtaining 4 or 8 bits from the predetermined position of the data string to be converted;

the determining module 512 is used for determining whether the decimal number corresponding to the obtained bits is larger than the data string to be converted in length;

and the outputting module 513 is used for taking the decimal number corresponding to the obtained bits, as offset if the decimal number is not larger than the data string to be converted in length; and for taking the residue computed from the decimal number corresponding to the obtained bits divided by the length of the data string to be converted, as offset or taking the differential, computed by the decimal number corresponding to the obtained bits minus the multiple times of the length of the data string to be converted, as the offset, if the decimal number is larger than the data string to be converted in length.

If the first obtaining unit 51 directly obtains 4 bits from the predetermined position of the data string to be converted, and due to size of the decimal number corresponding to the 4 bits is maxim 15, the first obtaining unit 51 can obtain the decimal number corresponding to the 4 bits as offset if size of the data string to be converted is larger enough, which will not result in an offset overflow.

The second obtaining unit 52 of the embodiment can be implemented by, but not limited to, two solutions as follows.

One is for obtaining the predetermined bits of data from the predetermined position of the data string to be converted, which is corresponding to the offset.

Another includes a computing module 521, a right shifting module 522 and a second obtaining module 223, wherein the computing module 521 is for obtaining the arithmetic right shifting bits by computing the offset according to the predetermined formula, which can be, but limited to the formula in embodiment 2, BITS=128−LBS4*8 wherein BITS refers to the arithmetic right shifting bits, and LBS4 refers to the offset;

the right shifting module 522 is for arithmetic right shifting of the data string to be converted according to the arithmetic right shifting bits;

and the second obtaining module 523 is for obtaining the predetermined bits of data from the lower bit of the shifted data string to be converted.

The embodiments are mainly used in all kinds of data converting devices and methods therefor, such as one time password generating method and device therefor.

With the above description, those skilled in prior art should understand that the invention can be implemented by software and necessary hardware or only by hardware. Based on the understanding, the essential of the invention or those contributing to the prior art can be implemented by software, which is stored in readable storage media, such as floppy disk, hard disk or compact disc etc, including instructions for executing methods of the embodiments in one computer device (personal computer, server or networking device etc.). The above mentioned is only preferred embodiments of the invention, not a limitation to the invention, and any modification or substitutions made by any skilled in prior art based on the invention, will be protected by the invention. In all, the protection scope of the invention should be based on the claims.

The invention claimed is:

1. A method for converting message to message digest, executed in a computer device, comprising
    obtaining, by the computer device, an offset from a predetermined position in a data string to be converted;
    obtaining, by the computer device, predetermined bits of data from the data string to be converted according to the offset;
    converting, by the computer device, the obtained data to decimal number; and
    determining, by the computer device, whether the length of the decimal number is smaller than a first predetermined length;
    if the length of the decimal number is not smaller than the first predetermined length, obtaining data of the first predetermined length from the lower digit of the decimal number successively and taking the obtained data as a converted data;
    if the length of the decimal number is smaller than the first predetermined length, keeping adding 0 to the upper digit of the decimal number till the first predetermined length is reached, and taking the data with added 0 as the converted data,
    wherein the predetermined position comprises the first byte, any one middle byte or the last byte of the data string to be converted,
    obtaining the offset from the predetermined position of the data string to be converted is obtaining 4 bits from the predetermined position of the data string to be converted and taking the decimal number corresponding to the obtained 4 bits as the offset, or the obtaining offset from the predetermined position of the data string to be converted comprising
    obtaining 4 bits or 8 bits from the corresponding byte in the predetermined position of the data string to be converted;
    determining whether the decimal number corresponding to the obtained bits is larger than the data string to be converted in length;
    if the decimal number corresponding to the obtained bits is not larger than the data string to be converted in length, taking the decimal number corresponding to the obtained bits as the offset;
    if the decimal number corresponding to the obtained bits is larger than the length of the data string to be converted, taking the residue, from the decimal number corresponding to the obtained bits divided by the length of the data string to be converted, as the offset; or taking the differential, from the decimal number corresponding to the obtained bits minus the multiple times of the length of the data string to be converted, as the offset,
    wherein obtaining the predetermined bits of data from the data string to be converted according to the offset comprises
        obtaining, by a hardware shifting module, an arithmetic right shifting bits by computing the offset according to the predetermined formula;
        right shifting of the data string to be converted according to the arithmetic right shifting bits;
        obtaining the predetermined bits of data from the lower bit of the right shifted data string to be converted,
    wherein the predetermined formula is BITS=128−LBS4*8, wherein BITS refers to the arithmetic right shifting bits and LBS4 refers to the offset.

2. The method of claim 1, wherein obtaining the predetermined bits of data from the data string to be converted according to the offset involves obtaining the predetermined bits of data from a position corresponding to the offset of the data string to be converted.

3. The method of claim 1, wherein obtaining the offset from the predetermined position in the data string to be converted comprises: obtaining the offset from the predetermined position in a data string to be converted for processing by a non-collision one-way algorithm.

4. The method of claim 3, wherein obtaining the offset from the predetermined position in a data string to be converted processed by a non-collision one-way algorithm comprises: obtaining the offset from the predetermined position in a data string to be converted for processing by a non-collision one-way algorithm which is Hash algorithm or Message Authentication Code algorithm.

5. A device for converting message to message digest, comprising
    first obtaining means for obtaining an offset from a predetermined position of the data string to be converted;
    second obtaining means for obtaining the predetermined bits of data from the data string to be converted according to the offset;
    converting means for converting the obtained bits of data to decimal number;
    determining means for determining whether the length of the decimal number is smaller than the first predetermined length; and
    outputting means for obtaining data of the first predetermined length from the lower bit of the decimal number successively and taking the obtained data as the converted data if the length of the decimal number is not smaller than the first predetermined length; or keeping adding 0 to the upper digit of the decimal number till the first predetermined length is reached and taking the data with added 0 as the converted data if the length of the decimal number is smaller than the first predetermined length, wherein the predetermined position comprises the first byte, any one middle byte or the last byte of the data string to be converted;

the first obtaining means for obtaining 4 bits of the predetermined position from the data string to be converted, and taking the decimal number corresponding to the obtained bits as the offset, or the first obtaining means comprises a first obtaining module for obtaining 4 bits or 8 bits from the corresponding byte in the predetermined position of the data string to be converted;

a determining module for determining whether the decimal number corresponding to the obtained bits is larger than the predetermined data in length; and an outputting module for taking the decimal number corresponding to the obtained bits as the offset, if the decimal number corresponding to the obtained bits is not larger than the data string to be converted in length; and for taking the residue, from the decimal number corresponding to the obtained bits divided by the length of the data string to be converted, as the offset; or taking the differential, from the decimal number corresponding to the obtained bits minus the multiple times of the length of the data string to be converted, as the offset, wherein the second obtaining means comprises arithmetic module for obtaining the arithmetic right shifting bits by computing the offset according to the predetermined formula;

a hardware right shifting module for arithmetic right shifting of the data string to be converted according to the arithmetic right shifting bits;

and a second obtaining module for obtaining the predetermined bits of data from the lower bit of the right shifted data string to be converted, wherein the predetermined formula is BITS=128−LBS4*8, in which BITS refers to the arithmetic right shifting bits and LBS4 refers to the offset.

6. The device of claim 5, wherein the second obtaining means obtains the predetermined bits of data from a position corresponding to the offset of the data string to be converted.

* * * * *